United States Patent Office 2,790,797
Patented Apr. 30, 1957

2,790,797

N-(P-CARBOXYPHENYLSULPHONYL) HEXA-METHYLENEIMINE

Jeffrey Meyrick Thorp and Bruce Ramsay Wilson, Manchester, England, assignors to Imperial Chemical Industries Limited, London, England, a corporation of Great Britain No Drawing. Application August 29, 1955,
Serial No. 531,248

Claims priority, application Great Britain
September 3, 1954

7 Claims. (Cl. 260—239)

This invention relates to a new benzene derivative and more particularly it relates to N-(p-carboxyphenylsulphonyl)hexamethyleneimine which is useful as an adjuvant in conjunction with the administration of penicillin.

According to the invention we provide the new benzene derivative, N-(p-carboxyphenylsulphonyl)hexamethyleneimine.

According to a further feature of the invention we provide a process for the manufacture of the said new N-(p-carboxyphenylsulphonyl)hexamethyleneimine which comprises interaction of a compound of the formula:

wherein X stands for a halogen atom and Y stands for a carboxyl, a nitrile or a carboxylic ester group, with hexamethyleneimine in the presence of an acid-binding agent and where necessary, hydrolysing the nitrile or the carboxylic ester group to a carboxyl group.

The said process may conveniently be carried out in the presence of a solvent or diluent and a suitable solvent may be for example acetone.

The said acid-binding agent may be for example hexamethyleneimine, pyridine or an aqueous solution of a hydroxide, a carbonate or a bicarbonate of an alkali or alkaline earth metal for example an aqueous solution of sodium hydroxide.

The said N-(p-carboxyphenylsulphonyl)hexamethyleneimine possesses the valuable property of extending the therapeutic action of penicillin in experimental animals. Thus when N-(p-carboxyphenylsulphonyl)hexamethyleneimine is administered to mice infected with Streptococcus Kruger and also treated with a non-curative dose of penicillin, the said mice survive for a longer period of time than when the N-(p-carboxyphenylsulphonyl)-hexamethyleneimine is not administered.

The invention is illustrated but not limited by the following example in which the parts are by weight:

Example 6 parts of p-carboxyphenylsulphonyl chloride are added to a stirred mixture of 5 parts of hexamethyleneimine and 22 parts of 10% aqueous sodium hydroxide solution at 10° C. The mixture is stirred for 3 hours and then filtered and the filtrate is acidified by the addition of hydrochloric acid and the mixture filtered. The solid residue is washed with water and crystallised from ethanol and there is obtained N-(p-carboxyphenylsulphonyl)-hexamethyleneimine as a colourless, crystalline substance, M. P. 234–236° C.

What we claim is:

1. The new benzene derivative, N-(p-carboxyphenylsulphonyl)hexamethyleneimine.

2. Process for the manufacture of N-(p-carboxyphenylsulphonyl)hexamethyleneimine which comprises reacting a compound of the formula:

wherein the X radical stands for a halogen atom and the Y radical stands for carboxyl, with hexamethyleneimine in the presence of an acid-binding agent.

3. The process of claim 2 when carried out in the presence of a liquid medium.

4. The process of claim 3 wherein said liquid medium is acetone.

5. The process of claim 2 wherein said acid-binding agent is hexamethyleneimine.

6. The process of claim 2 wherein said acid-binding agent is pyridine.

7. The process of claim 2 wherein said acid-binding agent is an aqueous solution of a member of the group consisting of the hydroxides, carbonates and bicarbonates of the alkali and alkaline earth metals.

No references cited.